US009231686B2

(12) United States Patent
Chen et al.

(10) Patent No.: US 9,231,686 B2
(45) Date of Patent: Jan. 5, 2016

(54) DYNAMIC ANTENNA SWITCHING

(71) Applicant: Apple Inc., Cupertino, CA (US)

(72) Inventors: Xiaojun Chen, Santa Clara, CA (US);
Peter M Agboh, San Francisco, CA (US); Indranil S Sen, Fremont, CA (US); Hsin-Yuo Liu, Fremont, CA (US); Vusthia Sunil Reddy, San Jose, CA (US); Diego C Hernandez, Foster City, CA (US); Digvijay A Jadhav, Sunnyvale, CA (US); Mohit Narang, San Jose, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/291,769

(22) Filed: May 30, 2014

(65) Prior Publication Data

US 2015/0349870 A1  Dec. 3, 2015

(51) Int. Cl.
*H04B 7/08* (2006.01)
(52) U.S. Cl.
CPC ............ *H04B 7/0814* (2013.01); *H04B 7/0817* (2013.01)
(58) Field of Classification Search
CPC .... H04B 7/0802; H04B 7/0817; H04B 7/082; H04B 7/0805; H04B 7/0808; H04B 7/0814; H04B 7/0602; H04B 7/0608
USPC ......... 455/277.1, 277.2, 101, 562.1; 375/219, 375/220, 267, 299, 347
See application file for complete search history.

(56) References Cited

U.S. PATENT DOCUMENTS

| | | | |
|---|---|---|---|
| 6,085,076 A * | 7/2000 | Lindsay ............... | H04B 7/0604 455/277.1 |
| 6,229,486 B1 | 5/2001 | Krile | |
| 6,330,433 B1 | 12/2001 | Jager | |
| 7,565,126 B2 | 7/2009 | Shatara et al. | |
| 7,676,202 B2 * | 3/2010 | Anton-Becker ....... | H04B 7/082 455/277.1 |
| 8,488,727 B1 | 7/2013 | Feng et al. | |
| 2005/0254591 A1 * | 11/2005 | Weil ..................... | H04B 7/0842 375/267 |
| 2012/0142295 A1 * | 6/2012 | Tseng et al. ............... | 455/226.2 |

* cited by examiner

*Primary Examiner* — Betsy Deppe
(74) *Attorney, Agent, or Firm* — Meyertons Hood Kivlin Kowert & Goetzel, P.C.; Jeffrey C. Hood

(57) ABSTRACT

Dynamic antenna switching based on weighted signal to noise ratio (SNR). A wireless device may include multiple antennas. SNR at each active antenna may be calculated. An antenna-specific weight may be applied to each antenna's SNR. The antenna-specific weights may further be radio specific and/or transmit or receive specific in some cases. Antenna selection (possibly just for a specific radio and/or for transmit or receive operations, depending on the specificity of the antenna weights), including potentially switching which antenna is used, may be based on the resulting weighted SNR values for each antenna. If the antenna-specific weights are radio specific and/or transmit or receive operation specific, the method may be performed multiple times with different antenna-specific weights to select antenna(s) for different radios and/or for other operations.

19 Claims, 5 Drawing Sheets

|  | Antenna 1 806 | Antenna 2 806 | ... | Antenna N 808 |
|---|---|---|---|---|
| Scenario 1 810 | TX | W_TX1_1 | W_TX2_1 | ... | W_TXN_1 |
|  | RX | W_RX1_1 | W_RX2_1 | ... | W_RXN_1 |
| Scenario 2 812 | TX | W_TX1_2 | W_TX2_2 | ... | W_TXN_2 |
|  | RX | W_RX1_2 | W_RX2_2 | ... | W_RXN_2 |
| ... | | | | |

FIG. 7

DYNAMIC ANTENNA SWITCHING

FIELD

The present application relates to wireless communication, and more particularly to a system and method for performing antenna switching in a wireless device.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

With the increasing number of wireless communication technologies in existence, it has become more common for wireless devices to implement multiple wireless communication technologies, often including multiple antennas and/or multiple radios to implement the multiple wireless communication technologies.

SUMMARY

Embodiments are presented herein of, inter alia, a method for a wireless user equipment (UE) device to dynamically switch antennas used for wireless communication, and of a device configured to implement the method.

According to the techniques described herein, the antenna or antennas to be used for reception, transmission, or both transmission and reception by a particular radio of a UE may be selected at least partially based on current and/or recent weighted signal to noise ratio (SNR) values of the antennas of the UE.

The set(s) of antenna weights used for a particular radio at a particular time may be based on any of a variety of considerations, which may relate to physical characteristics of the antennas and/or the radio, the wireless communication technology implemented by the radio, coexistence considerations, and/or any of various other factors.

Using such weighted SNR values as a basis for selecting which antenna(s) are to be used by which radio(s) over time may result in the UE dynamically switching antennas in a manner that considers the current radio frequency conditions being experienced by the antennas of the UE, the underlying physical characteristics of the UE and it's components, and/or the characteristics of the current communication scenario being experienced by the UE.

Note that the techniques described herein may be implemented in and/or used with a number of different types of devices, including but not limited to, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings.

FIG. 7 illustrates an exemplary weights table format which could be used in conjunction with the methods of FIGS. 5-6.

Figure 1:
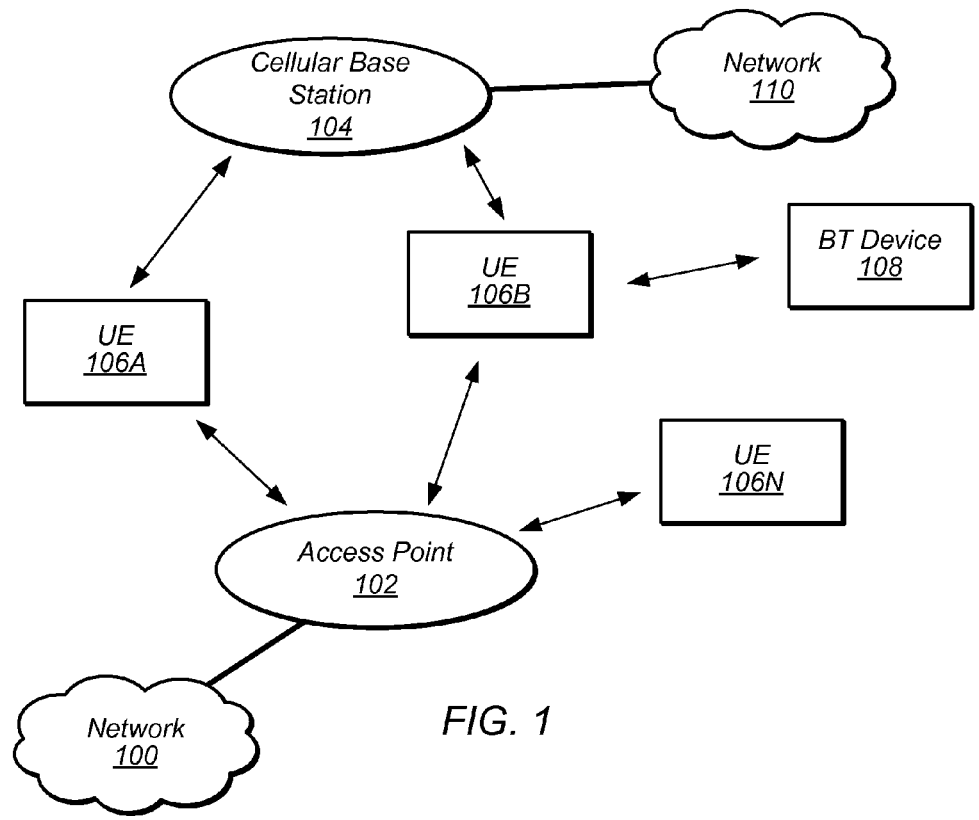
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
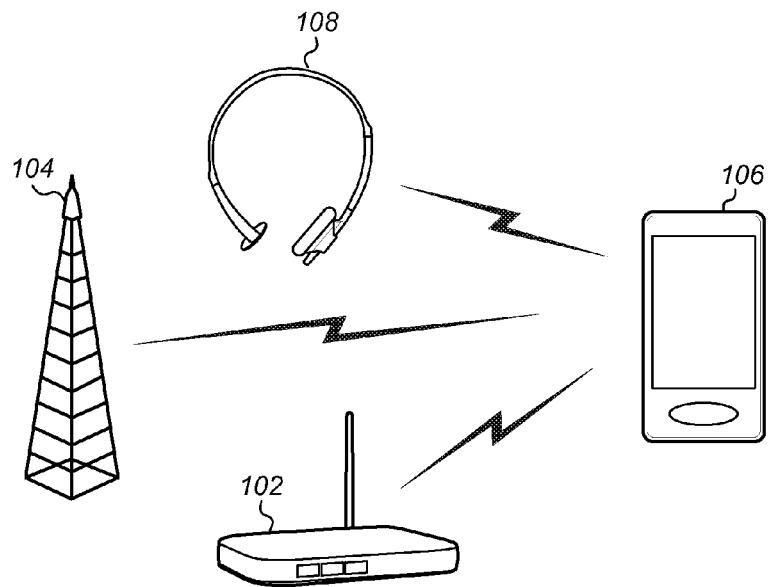
FIG. 2 illustrates a wireless device performing wireless communication according to multiple wireless communication technologies.

FIGS. 1 and 2—Exemplary Communication System

FIGS. 1 and 2 illustrate an exemplary (and simplified) wireless communication system. It is noted that the system of FIG. 1 is merely one example of a possible system, and embodiments may be implemented in any of various systems, as desired.

As shown, the exemplary wireless communication system includes an access point 102 which communicates over a transmission medium with one or more user devices 106A, 106B, etc., through 106N. Each of the user devices may be referred to herein as a "user equipment" (UE). Thus, the user devices are referred to as UEs or UE devices.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using Wi-Fi, including any of various versions of IEEE 802.11 (e.g., a, b, g, n, ac, etc.).

One or more of the UEs 106 (e.g., UEs 106A, 106B) may also or alternatively be configured to communicate with a base station 104. The base station 104 may be a base transceiver station (BTS) or cell site (a "cellular base station"), and may include hardware that enables wireless communication with UEs 106 according to one or more cellular communication protocols. Such a UE 106 and the cellular base station 104 may communicate using any of various cellular communication technologies such as GSM, UMTS (WCDMA, TDS-CDMA), LTE, LTE-Advanced (LTE-A), 3GPP2 CDMA2000 (e.g., 1xRTT, 1xEV-DO, HRPD, eHRPD), etc.

As shown, the cellular base station may be equipped to communicate with a network 110 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 110. The cellular base station 104 may provide UEs 106 with various telecommunication capabilities, such as voice, SMS, and/or data services.

One or more of the UEs 106 (e.g., UE 106B) may also or alternatively be configured to communicate with a Bluetooth device 108 via a Bluetooth link. The Bluetooth device 108 may be any of a variety of types of Bluetooth devices, including a headset, a car speaker system, mouse, keyboard, or other input device, another wireless device, etc.

Thus, at least in some instances a UE 106 may be capable of communicating using multiple wireless communication technologies, such as exemplified by UEs 106A and 106B illustrated in FIG. 1. In addition or as alternatives to Wi-Fi, Bluetooth, and various cellular communication standards, a UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication technology, as desired. Note additionally that it may also be possible for a UE to only be capable of communicating using a single wireless communication technology, if desired.

FIG. 2 illustrates a UE device 106 (e.g., UE device 106B illustrated in FIG. 1) in communication with a Wi-Fi access point 102, cellular base station 104, and Bluetooth device 108. Thus, the UE 106 may be configured to communicate using any of multiple wireless communication protocols. The UE 106 may be any of various possible devices with wireless communication capability, such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include multiple antennas for communicating using one or more wireless communication protocols or technologies. In one embodiment, the UE 106 might be configured to communicate using either of multiple wireless communication technologies using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies.

In some embodiments, the UE 106 may include separate transmit and/or receive chains for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

In some instances, couplings between some or all antennas and radios of a UE 106 may be dynamically configurable. For example, antenna switching logic may be provided in a UE 106 to dynamically determine and configure (or reconfigure) which antenna(s) of the UE will be used for wireless communication by which radio(s). One or more antennas and radios of a UE 106 may alternatively or additionally be permanently (fixedly) coupled to each other, if desired.

Figure 3:
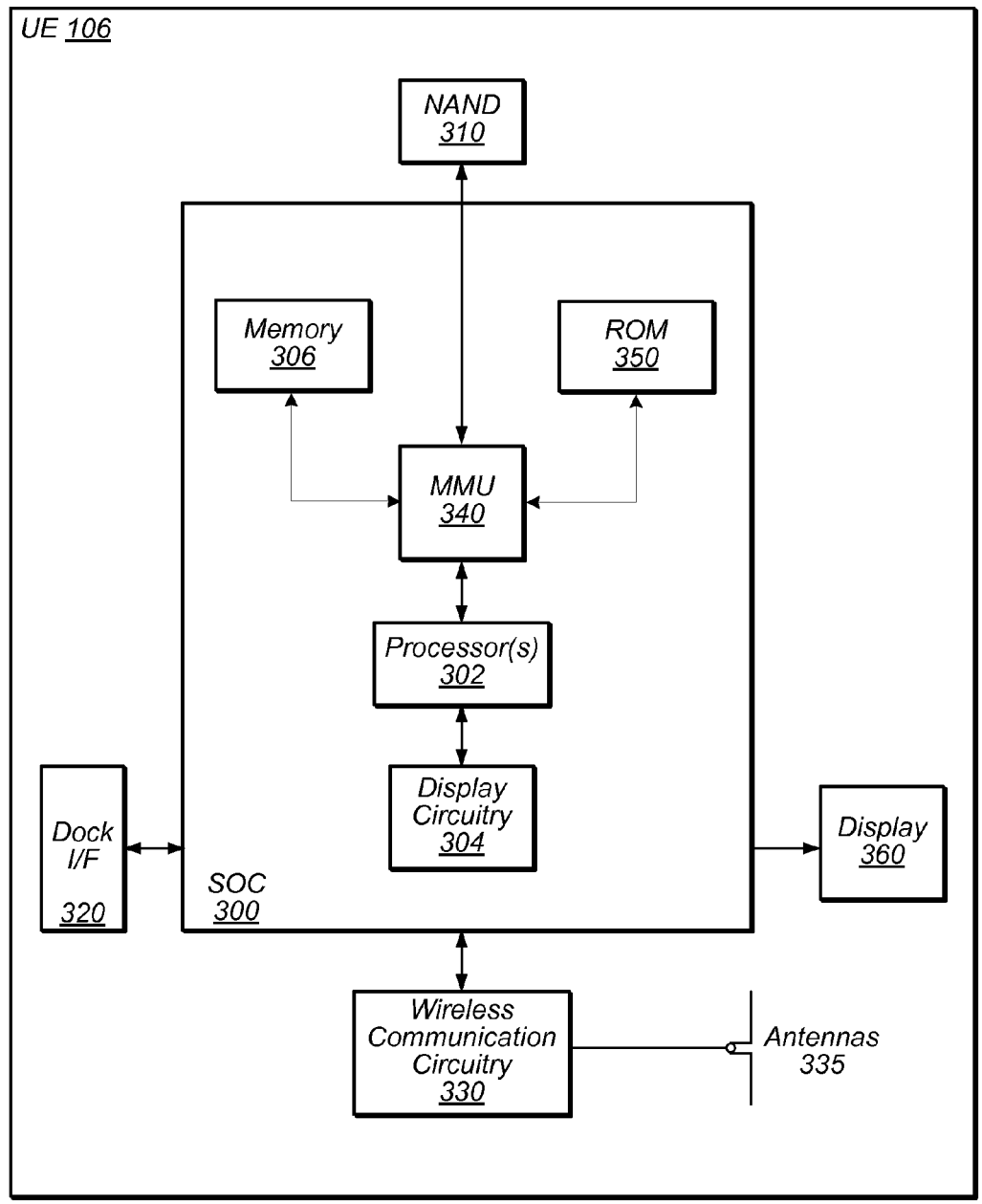
FIG. 3 is a block diagram illustrating an exemplary wireless device.

FIG. 3—Exemplary Block Diagram of a Wireless Device

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (e.g., including one or more radios), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As noted above, the UE 106 may be configured to communicate wirelessly using multiple wireless communication technologies. As further noted above, in such instances, the wireless communication circuitry (radio(s)) 330 may include radio components which are shared between multiple wireless communication standards and/or radio components which are configured exclusively for use according to a single wireless communication standard. As shown, the UE device 106 may include multiple antennas 335 (e.g., for implementing different wireless communication technologies, for MIMO, for flexibility, etc., among various possibilities) for performing wireless communication with base stations, access points, and/or other devices.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

The UE 106 may include hardware and software components for implementing the features described herein. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
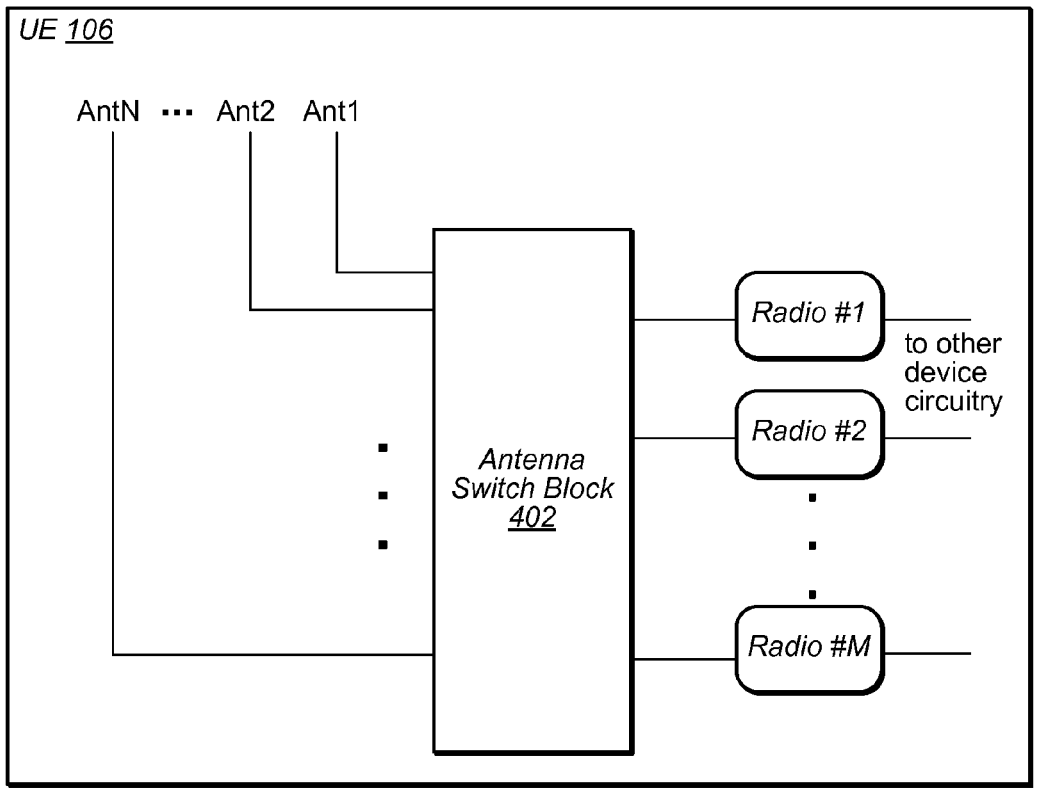
FIG. 4 is a block diagram illustrating an exemplary RF portion of a wireless device.

FIG. 4—Exemplary Block Diagram of an RF Portion of a Wireless Device

FIG. 4 is a block diagram illustrating an exemplary RF portion of a wireless device (such as one of the UEs 106 illustrated in FIGS. 1-3) with a configurable antenna arrangement. It should be noted that the exemplary details illustrated in and described with respect to FIG. 4 are not intended to be limiting to the disclosure as a whole: numerous variations and alternatives to the details provided herein below with respect to FIG. 4 are possible and should be considered within the scope of the disclosure.

As shown, the UE 106 may include an array of N antennas and an array of M radios. Each antenna and each radio may couple to an antenna switch block 402. The antenna switch block 402 may be capable of switching couplings/connections between antennas of the antenna array and radios of the radio array to provide connectivity between various radio/antenna combinations.

Any of various algorithms may be used to determine how the antenna switch block 402 switches connectivity between the various possible radio/antenna combinations. As one possibility, a technique which utilizes radio specific weighted signal to noise ratio (SNR) values for each antenna to dynamically assign antennas and radios for use together (for example according to any of the features described further subsequently herein with respect to FIG. 5 and/or FIG. 6) may be used.

Figure 5:
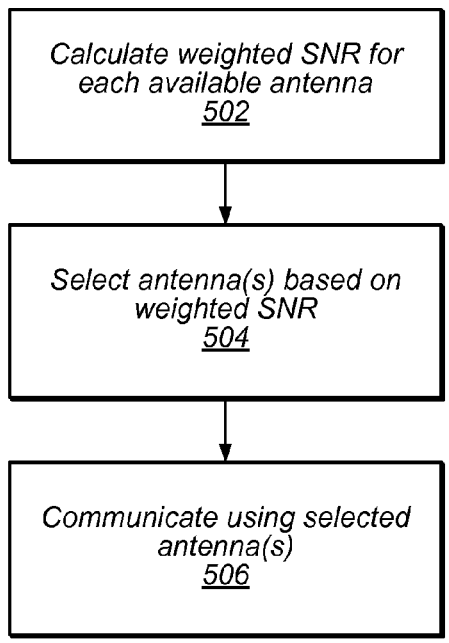
FIGS. 5-6 are flowchart diagrams illustrating methods for a wireless device to dynamically switch antennas.
Figure 6:
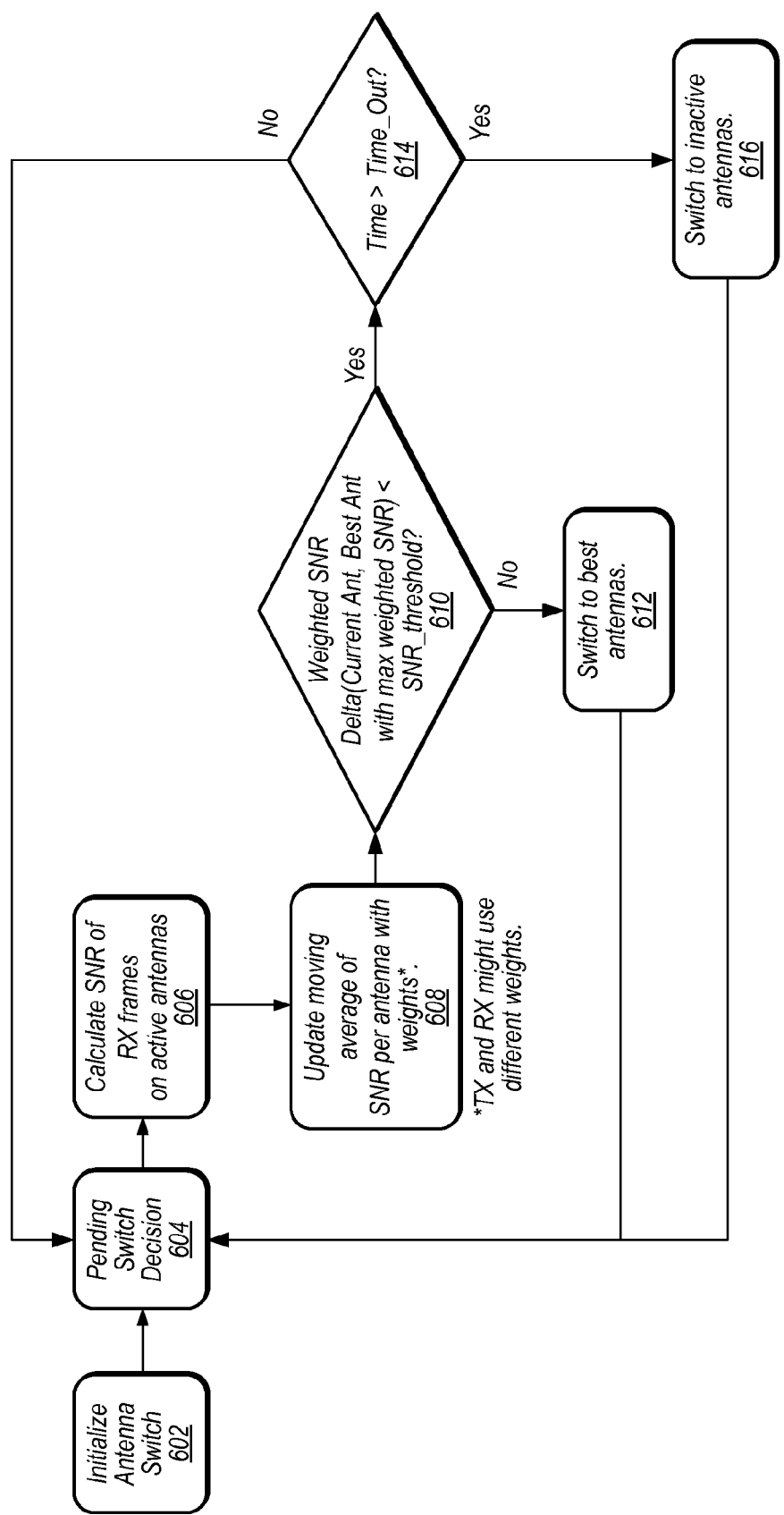

FIGS. 5-6—Dynamic Antenna Selection Based on Weighted SNR Values

As previously noted herein, many wireless devices may be configured to communicate according to multiple wireless communication technologies. In many cases, this may include providing multiple radios and/or multiple antennas in the wireless device. The different radios and antennas may have different characteristics. For example, two different radios of a wireless device might be designed to generate and/or receive wireless communication signals in different frequency bands and/or at different power levels, with different noise and/or interference sensitivities, and/or different temporal patterns, among various possible differences, for example based on different wireless communication technologies implemented by the two radios. Furthermore, in many cases a radio may be capable of operating in different manners at different times; for example, a Wi-Fi radio might be capable of generating and/or receiving signals for communication in either of the 2.4 GHz radio frequency (RF) band or the 5 GHz RF band, or might be capable of generating and/or receiving signals according to either of GSM or LTE, or 1xRTT or LTE, among various possibilities.

Similarly, different antennas (and possibly associated transmission lines, baluns, etc.) may be designed for different applications, and so for example might have different resonant frequencies, directionality, shielding, balance/imbalance, and/or other differing characteristics.

It may thus sometimes be the case that, based on radio and antenna characteristics (and possibly also depending on a particular communication scenario), and under equal wireless communication medium conditions, one or more antennas of a wireless device may be better suited for use in conjunction with a particular radio of the wireless device than other antennas of the wireless device.

However, in practice, variations in wireless communication medium conditions (e.g., RF conditions) at each antenna may also have a significant impact on which antenna(s) perform best in conjunction with a particular radio at any given time. For example, different antennas of a wireless device may experience different signal strength as well as different noise and interference conditions at different times. Thus, it may be the case that in some instances, an antenna which is not the most well suited antenna for a particular radio based on antenna and radio characteristics and a given communication scenario may still provided the best performance for that radio at a particular time if RF conditions are significantly better at that antenna than at other antennas of the wireless device. However, it may also be possible that if RF conditions at an antenna which is best suited for a particular radio based on antenna and radio characteristics and a given communication scenario are only slightly worse than RF conditions at an antenna which is not as well suited for that particular radio in that communication scenario at a particular time, that 'best suited' antenna may provided the best performance for that radio at that time.

Accordingly, at least in some instances, performance improvements may be achieved in a wireless device by providing flexibility in antenna selection, with consideration given to RF conditions experienced at each antenna as well as compatibility/interaction between radio and antenna characteristics in a current communication scenario. FIG. 5 is a flowchart diagram illustrating a method for providing such flexible antenna selection and dynamic antenna switching capability. More particularly, the method of FIG. 5 may be used to select an antenna (or multiple antennas) for wireless communication use (e.g., transmission, reception, or both) by a particular radio of a wireless device at a particular time.

The method shown in FIG. 5 may be used in conjunction with any of the computer systems or devices shown in the above Figures, among other devices. As one particular example, the method may be implemented by a wireless user equipment device, such as a UE 106 illustrated in and described herein with respect to FIGS. 1-4. The UE may include multiple antennas, at least a subset of which may be available for switching between by the radio for which an antenna is being selected according to the method of FIG. 5. The UE may also include multiple radios, though the method may alternatively be implemented in a UE including a single radio if desired. In various embodiments, some of the method elements shown may be performed concurrently, in a different order than shown, or may be omitted. Additional method elements may also be performed as desired. As shown, this method may operate as follows.

In 502, a weighted signal to noise ratio (SNR) for each available antenna of the UE may be calculated. Calculating the weighted SNR for each antenna may first include calculating SNR of receive frames on each active antenna. The SNR calculated for a given antenna may be a moving average of SNR values over a window of recent receive frames, or an 'instantaneous' SNR of just the most recent receive frame on the given antenna, among various possibilities, as desired.

The resulting SNR for each respective antenna may then be modified by an antenna-specific weight. In other words, each antenna may be assigned a weight factor to bias the antenna's SNR value for the purpose of antenna selection. Thus, each respective antenna's antenna-specific weight may be applied to the respective antenna's SNR to produce the respective antenna's weighted SNR. The antenna weights may be dimensionless values (e.g., scaling factors). As one possibility, the antenna weights may be scaled between 0-1. Alternatively, any number of other scales may be used, as desired.

The antenna weights used may be specific to the radio for which the antenna selection is being performed. For example, the antenna weights may be based on characteristics of the antenna and the radio and their suitability for each other. The antenna weights may also be based on a particular communication scenario of the UE. For example, different sets of antenna weights may be used for a particular radio depending on a frequency band in which the radio is transmitting and/or receiving, and/or based on what other wireless communication technologies are also active at the UE, and their current communication characteristics (i.e., coexistence considerations). Thus, different sets of antenna weights might be used for a WLAN radio depending on whether 5 GHz or 2.4 GHz communication is occurring, depending on whether Bluetooth communication is occurring, depending on whether cellular communication is occurring (and in which bands), etc. Similarly, different sets of antenna weights might be used for a cellular radio depending on a radio access technology (RAT) currently in use, and/or based on WLAN and/or Bluetooth coexistence considerations. Other types of radios and communication scenarios are also possible, and different sets of antenna weights may likewise be used in such cases.

Additionally, or alternatively, different sets of antenna weights may be used to select an antenna (or multiple antennas) for transmission than for reception for a particular radio. For example, certain antenna preferences might differ for a given radio for transmission and reception, for example due to power considerations, specific absorption ratio (SAR) characteristics and regulations, asymmetric uplink/downlink characteristics of a particular wireless communication technology, etc.

Thus, calculating the weighted SNR for each available active antenna may be performed on a radio specific, communication scenario specific, and/or transmit/receive specific basis, by using a radio specific, communication scenario specific, and/or transmit/receive specific set of antenna weights to calculate the weighted SNRs for the antennas.

In 504, an antenna (or multiple antennas, depending on the number of antennas to be used by the radio) may be selected based at least in part on the calculated weighted SNRs of the antennas. If desired, the antenna(s) selected may simply be the antenna(s) with the highest weighted SNR of the available antennas. Alternatively, a delta or threshold may be used, for example such that an antenna which is currently being used may continue to be used unless the weighted SNR of the antenna with the highest weighted SNR exceeds the weighted SNR of the antenna which is currently being used by at least a configured SNR delta or threshold. Such a technique may for example provide a degree of hysteresis and result in less frequent switching between antennas, particularly in cases when switching would prove little or no marginal benefit.

Since it may be possible to calculated SNR (and thus weighted SNR) only on antennas which are being actively used or have recently been actively used, it may be possible that an inactive antenna may not be selected if weighted SNR is used exclusively for antenna selection. Accordingly, if desired, further techniques may be provided as an aspect of antenna selection to ensure all available antennas are at least occasionally used.

Some such techniques may include the use of a timer. As one example, a timer having a selected initial value may run continuously and reset to the initial value at expiration. Upon expiration, if there is at least one inactive antenna, that antenna may be selected. As another example, a timer having a selected initial value may start once at least one antenna becomes inactive. If the antenna remains inactive through expiration of the timer, the inactive antenna may be selected. Other techniques for avoiding inadvertent antenna inactivity may also or alternatively be used.

In 506, communication may be performed by the radio using the selected antenna(s) based on the antenna selection. If a selected antenna is not already coupled to the radio (e.g., if it is not the antenna most recently used by the radio), switching logic may re-configure the UE front-end (e.g., by altering switch positions) such that the radio is coupled to the selected antenna. In other words, the antenna used for the communication (e.g., receiving and/or transmitting wireless communication signals) may be switched from a previously used ("first") antenna to the selected ("second") antenna based on selecting the second antenna for use by the radio.

The communication may include reception of signals and/or transmission of signals. Note that at least in some instances (e.g., if the antenna selection method of FIG. 5 is being performed to select an antenna for only one of transmit or receive operations) the communication on the selected antenna by the radio using the selected antenna based on the antenna selection may include only reception of signals, or only transmission of signals. In such a case, a separate antenna selection process (e.g., using different antenna weights to calculate the weighted SNRs) may be used to select one or more antennas for the radio to use for the other of transmit or receive operations.

In other words, the method may be repeated in order to perform antenna selection for each of transmit and receive operations of a given radio, if desired. Furthermore, the method may also or alternatively be repeated in order to perform antenna selection for different radios of a UE, and/or at different times, as desired. Some or all such iterations of the method may utilize different sets of antenna weights (e.g., transmission weights for transmission antenna selection and reception weights for reception antenna selection for a given radio, different weight sets for a given radio in different communication and/or coexistence scenarios, different weight sets for different radios, etc.), such that the antenna weight for each particular antenna may differ between different sets of antenna weights.

For example, if desired, after calculating SNR of each active available antenna, for each respective radio of the UE, a receive-weighted SNR for each antenna could be calculated using a radio-specific receive-specific set of antenna weights, and one or more antennas could be selected for use by the respective radio for reception based on the receive-weighted SNRs. Similarly, if desired, for each respective radio of the UE, a transmit-weighted SNR for each antenna could be calculated using a radio-specific transmit-specific set of antenna weights, and one or more antennas could be selected for use by the respective radio for transmission based on the transmit-weighted SNRs.

FIG. 6 is a flowchart diagram illustrating details of one possible exemplary implementation of the method of FIG. 5. It should be noted, however, that the exemplary details illustrated in and described with respect to FIG. 6 are not intended to be limiting to the disclosure as a whole: numerous variations and alternatives to the details provided herein below are possible and should be considered within the scope of the disclosure.

The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, antenna switching may be initialized in the UE implementing the method. Initializing antenna switching may include enabling an antenna switching feature in the UE, for example if the feature is optional. Alternatively (e.g., if the feature is permanently enabled) antenna switching may automatically be initialized as part of wireless communication operation of the UE.

In 604, the antenna switching logic may wait in a pending switch decision state. The algorithm may be repeated periodically, and thus between potential switch decision triggers (e.g., time or event based triggers, such as expiration of a timer or new information becoming available) the antenna switching logic may wait in the pending switch decision state.

In 606, SNR of frames received on active antennas may be calculated. This calculation may be triggered as frames arrive, and/or at periodic time intervals, e.g., as desired based on the potential switch decision trigger(s) used.

In 608, a moving average SNR for each antenna may be updated with the receive frame SNRs calculated in step 606. The moving average SNR for each antenna may include an average over a desired temporal window, or over a desired number of frame samples, among various possibilities. In some instances, the window may depend on a data rate of communications being performed on the antenna; for example, a longer moving average may be calculated for lower data rates, while a smaller/shorter moving average may be calculated for higher data rates.

Updating the moving average SNR may also include applying a weight to each antenna's SNR. If desired, different weights may be applied (thus resulting in different weighted SNR values) for each of transmit and receive antenna selection/switching algorithms. The antenna weights may be based on SAR considerations, multiple radio coexistence considerations, antenna imbalance, Bluetooth-WLAN coexistence considerations, and/or any of various other factors.

In 610, it may be determined whether or not a weighted SNR delta is less than a weighted SNR threshold ("SNR threshold"). The weighted SNR delta may be the difference between the weighted SNR of the current antenna (i.e., of the transmit or receive operation of the particular radio for which antenna selection is being performed) and the weighted SNR of the antenna with the highest weighted SNR. As one possibility, the weighted SNR delta may be 3 dB. Other values (e.g., 1 dB, 2 dB, 5 dB, etc.) may alternatively be used if desired.

If the weighted SNR delta is not less than the weighted SNR threshold, the algorithm may proceed to step 612. In this case, the antenna with the highest weighted SNR may be selected, and switched to for the transmit or receive operation of the particular radio for which antenna selection is being performed. The method may then proceed back to step 604 and await a next trigger to update antenna selection and potentially perform an antenna switch.

If the weighted SNR delta is less than the weighted SNR threshold, the algorithm may proceed to step 614. In this case, it may further be determined whether or not a timer has expired. The timer may be used to ensure certain antennas of the UE do not remain indefinitely unused. As one possibility, the timer may have a length of two seconds. Other values (e.g., one second, five seconds, 100 ms, etc.) may alternatively be used as desired. If the timer is not expired, the algorithm may simply proceed back to 604 without switching antennas used for the transmit or receive operation of the particular radio for which antenna selection is being performed. Thus in this case, the most recently used antenna may continue to be used for that radio and transmit or receive operation, at least until a next trigger to update antenna selection and potentially perform an antenna switch.

If the timer is expired, however, the algorithm may proceed to step 616. In this case an inactive antenna may be selected, and switched to for the transmit or receive operation of the particular radio for which antenna selection is being performed. The method may then proceed back to step 604 and await a next trigger to update antenna selection and potentially perform an antenna switch.

Thus, the method of FIG. 6 may be used to determine whether or not to switch antennas used by a particular radio for either (or both) of receive or transmit operations, and to which antenna(s) to switch. Similar to the method of FIG. 5, the algorithm may be repeated in parallel for each of transmit and receive operations and/or for different radios of the UE, possibly using different antenna weights for each radio and transmit or receive operation.

Moreover, if desired, it may be possible to use different antenna weights when performing the method at different times for a particular transmit or receive operation of a particular radio. For example, if coexistence considerations change, this may be considered to be a different communication scenario for the radio, and a different set of antenna weights may be used to perform antenna selection for the transmit or receive operation of the radio accordingly.

FIG. 7 illustrates an exemplary table format which may be used to store sets of antenna weights for such different scenarios, if desired. It should be noted, however, that the exemplary details illustrated in and described with respect to FIG. 7 are not intended to be limiting to the disclosure as a whole: numerous variations and alternatives to the details provided herein below are possible and should be considered within the scope of the disclosure.

As shown, for each of multiple antennas (i.e., Antenna 1 804, Antenna 2 806, . . . , Antenna N 808), transmit-weight and receive-weight values may be defined according to each of as many possible scenarios as desired. Thus, in a first scenario ("scenario 1") 810, the transmit weight of antenna 1 804 may be W_TX1_1, the receive weight of antenna 1 804 may be W_RX1_1, the transmit weight of antenna 2 806 may be W_TX2_1, the receive weight of antenna 2 806 may be W_RX2_1, and so on, through antenna N. Similarly, in a second scenario ("scenario 2") 812, the transmit weight of antenna 1 804 may be W_TX1_2, the receive weight of antenna 1 804 may be W_RX1_2, the transmit weight of antenna 2 806 may be W_TX2_2, the receive weight of antenna 2 806 may be W_RX2_2, and so on, again through antenna N. Receive and transmit antenna weights for a particular radio (or for each of multiple radios) may be defined and stored in such a table for any number of additional communication scenarios.

As a specific example of different possible scenarios resulting in different antenna weights, consider the following WLAN/Bluetooth coexistence scenarios. In a first scenario, WLAN and Bluetooth may both be communicating in the 2.4 GHz frequency band. In this scenario, it may be desirable to utilize the same antenna weights for the two wireless communication technologies, so that both will follow the same antenna switching logic, since WLAN/Bluetooth may utilize time division duplexing as a coexistence technique, and it may accordingly be desirable for their antenna selections to be the same. In a second scenario, in contrast, WLAN may be communicating in the 5 GHz frequency band while Bluetooth may be communicating in the 2.4 GHz frequency band. In this case, instead of utilizing the same antenna weights as the 5 GHz WLAN, it may be preferable to use different antenna weights for Bluetooth than for 5 GHz WLAN, due to 2.4 GHz antenna imbalance factors. It should be noted that while these exemplary (simplified) scenarios illustrate one possible difference between antenna weights which may be used in different communication scenarios, any number of additional or alternative communication scenarios and associated antenna weights may be used, as desired.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
a plurality of antennas;
a plurality of radios; and
antenna switching logic coupled to the plurality of radios and the plurality of antennas;
wherein the antenna switching logic is configured to:
calculate signal-to-noise ratio (SNR) of receive frames on each active antenna of the plurality of antennas; and
for each respective radio of the plurality of radios:
calculate a receive-weighted SNR for each active antenna using a respective receive-specific set of antenna weights; and
select one or more antennas for use by the respective radio for reception based on the receive-weighted SNR for each active antenna.

2. The UE of claim 1, wherein the antenna switching logic is further configured to, for each respective radio of the plurality of radios:
calculate a transmit-weighted SNR for each active antenna using a respective transmit-specific set of antenna weights;
select one or more antennas for use by the respective radio for transmission based on the transmit-weighted SNR for each active antenna.

3. The UE of claim 2,
wherein at least one antenna weight differs between a respective transmit-specific set of antenna weights and a respective receive-specific set of antenna weights for at least one radio.

4. The UE of claim 1, wherein selecting the one or more antennas for use by a respective radio for reception is based at least in part on a delta between weighted SNR of an antenna having a highest receive-weighted SNR and weighted SNR of an antenna currently used for reception by the respective radio.

5. The UE of claim 1, wherein to select the one or more antennas for use by a respective radio for reception, the antenna switching logic is further configured to:
calculate a weighted SNR delta between an antenna having a highest receive-weighted SNR and an antenna currently used for reception by the respective radio; and
select the antenna having the highest receive-weighted SNR for use by the respective radio for reception if the weighted SNR delta is greater than a SNR threshold;
select the antenna currently used for reception by the respective radio for use by the respective radio for reception if the weighted SNR delta is less than the SNR threshold and a timer has not expired; or
select an inactive antenna for use by the respective radio for reception if the weighted SNR delta is less than the SNR threshold and the timer has expired.

6. The UE of claim 1, wherein a respective receive-specific set of antenna weights of a respective radio is configured based on one or more of:
antenna characteristics;
radio characteristics;
characteristics of a wireless communication technology according to which the respective radio operates; and
co-existence considerations between wireless communication technologies currently active in the UE.

7. The UE of claim 1,
wherein calculating SNR of receive frames comprises updating a moving average SNR over a plurality of recently received frames.

8. A method for a wireless user equipment (UE) device, comprising:
calculating a weighted signal-to-noise ratio (SNR) of each antenna of a plurality of antennas of a wireless device, wherein calculating the weighted SNR of each antenna comprises applying an antenna-specific weight factor to SNR of frames received on the antenna;
selecting an antenna from the plurality of antennas based on the weighted SNR of each of the plurality of antennas,
performing wireless communication using the selected antenna.

9. The method of claim 8,
wherein said calculating, selecting, and performing are performed for each of a plurality of radios of the UE, wherein calculating the weighted SNR of each antenna uses different antenna-specific weight factors for each of the plurality of radios.

10. The method of claim 8,
wherein said calculating, selecting, and performing are performed for each of transmit and receive operations of the UE, wherein calculating the weighted SNR of each antenna uses different antenna-specific weight factors for transmit and receive operations.

11. The method of claim 8, wherein selecting the antenna comprises:
calculating a difference between a highest weighted SNR of the plurality of antennas and a weighted SNR of an antenna most recently used for wireless communication; and
selecting an antenna having the highest weighted SNR if the difference between the highest weighted SNR and the weighted SNR of the antenna most recently used for wireless communication is greater than a weighted SNR threshold.

12. The method of claim 11, wherein selecting the antenna further comprises:
selecting the antenna most recently used for wireless communication if the difference between the highest weighted SNR and the weighted SNR of the antenna most recently used for wireless communication is less than the weighted SNR threshold and if a timer has not expired.

13. The method of claim 12, wherein selecting the antenna further comprises:
selecting a currently inactive antenna if the difference between the highest weighted SNR and the weighted SNR of the antenna most recently used for wireless communication is less than the weighted SNR threshold and if the timer has expired.

14. The method of claim 8,
wherein the selected antenna has a highest weighted SNR of the plurality of antennas.

15. The method of claim 8, the method further comprising:
repeating said calculating, selecting, and performing a plurality of times in a periodic manner.

16. A non-transitory computer-accessible memory medium comprising program instructions which, when executed by a wireless user equipment (UE) device, cause the UE to:
   initially receive wireless communication signals at a first radio of the UE via a first antenna of the UE;
   calculate weighted signal-to-noise ratio (SNR) of each of the first antenna and a second antenna of the UE;
   select the second antenna of the UE for subsequent wireless reception by the first radio based at least in part on calculating the weighted SNR of each of the first antenna and the second antenna of the UE; and
   switch an antenna used to receive wireless communication signals at the first radio from the first antenna to the second antenna based on selecting the second antenna of the UE for subsequent wireless reception by the first radio.

17. The memory medium of claim 16,
wherein calculating the weighted SNR of each of the first antenna and the second antenna comprises applying a first antenna weight to a SNR of the first antenna and a second antenna weight to a SNR of the second antenna.

18. The memory medium of claim 17,
wherein the first antenna weight and the second antenna weight are different and are based on one or more of:
a type of wireless communication performed by the first radio;
antenna imbalance of each of the first antenna and the second antenna; and
types of wireless communication being performed by other components of the UE.

19. The memory medium of claim 16,
wherein the second antenna is selected based on having a weighted SNR greater than the weighted SNR of the first antenna by at least a weighted SNR threshold.

* * * * *